Sept. 22, 1925.
P. A. E. ARMSTRONG
1,554,615
ARTICLE RESISTANT TO FOOD ACIDS AND PROCESS OF MAKING SAME
Filed Dec. 1, 1922
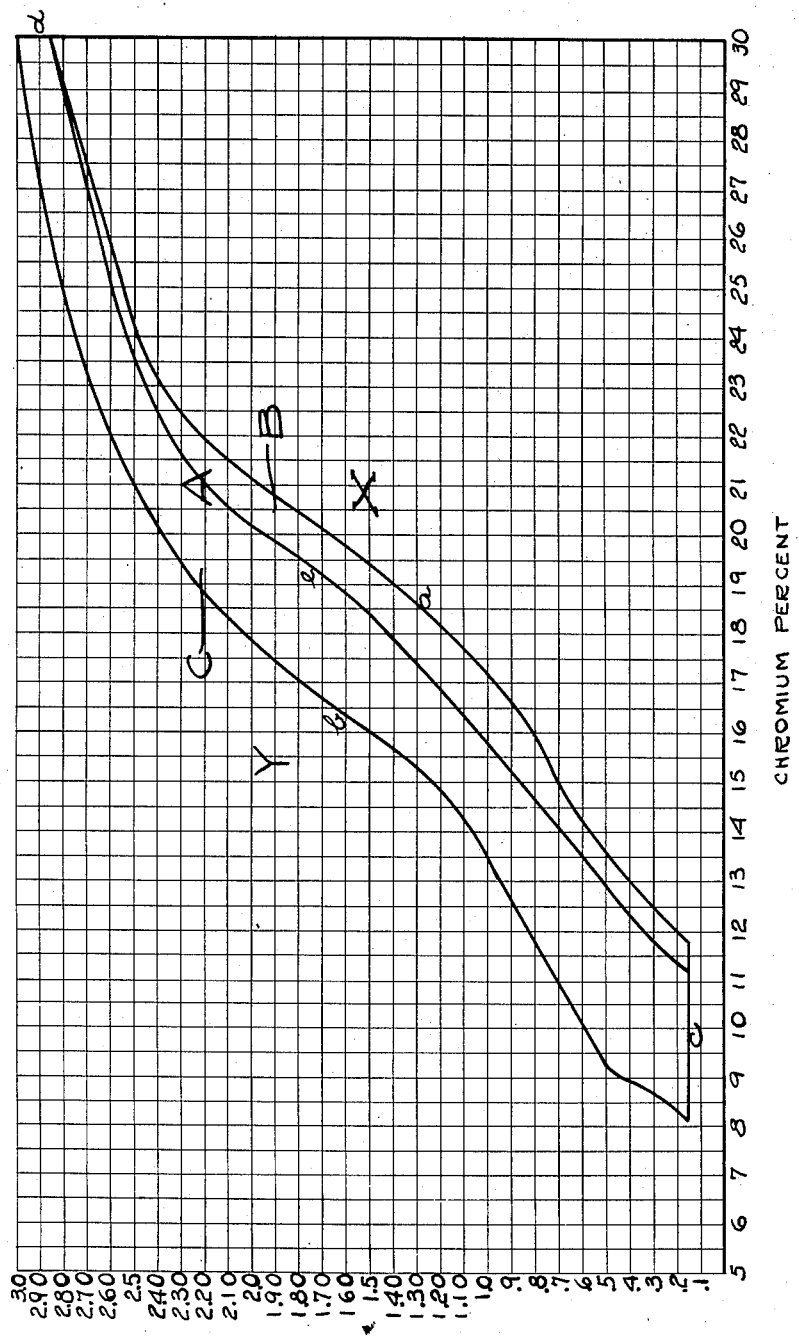
INVENTOR
Percy A. E. Armstrong
BY H. H. Dyke
ATTORNEY Patented Sept. 22, 1925.

1,554,615

UNITED STATES PATENT OFFICE.

PERCY A. E. ARMSTRONG, OF LOUDONVILLE, NEW YORK, ASSIGNOR TO LUDLUM STEEL COMPANY, OF WATERVLIET, NEW YORK, A CORPORATION OF NEW JERSEY.

ARTICLE RESISTANT TO FOOD ACIDS AND PROCESS OF MAKING SAME.

Application filed December 1, 1922. Serial No. 604,241.

*To all whom it may concern:*

Be it known that I, PERCY A. E. ARMSTRONG, a subject of the King of Great Britain, and a resident of and having a post-office address at Loudonville, county of Albany, and State of New York, have invented a new and useful Improvement in Articles Resistant to Food Acids and Processes of Making Same, of which the following is a specification.

Alloys of iron with carbon and with or without small percentages of one or more other metals and/or metalloids are acted upon in a relatively short time by food acids, such as vinegar, for example, and such action is encountered in substantially all states of the alloys, as hardened, annealed and the like.

When such alloys, however, contain chromium together with carbon in the percentages indicated along the coordinate axes, so as to come within the area A bounded by lines $a$, $b$, $c$ and $d$ in the accompanying drawing, forming a part of this specification, and are heat treated as hereinafter described, the preferably polished surfaces of the metal are substantially immune to the action of food acids.

The area A of the accompanying drawing, bounded about as shown, contains substantially that part of the various alloys containing chromium and carbon within which heating and rapidly cooling serves to secure the two-fold effect of imparting suitable hardness for edge tools and the like, and of imparting to the alloy compositions a substantially high degree of immunity to action of food acids not so characteristic of the alloy in other conditions, as, for example, when heated and cooled slowly.

It is to be understood that the area A is not to be considered as bounded by sharp lines, as $a$, $b$, $c$, $d$, but that the transitions in respect of carbon and chromium contents are comparatively gradual, and there may be more or less variation on either side from the lines as $a$, $b$, $c$ and $d$, which, however, serve to give an understanding of about where the limiting values have been found to be located.

With carbon under about .15%, that is to say, below the line $c$, the material cannot be given very great hardness by heat treatment. I draw a vertical line at $d$ merely because chromium over 30% is not of practical interest for present purposes.

The relatively low-carbon-high-chromium alloys of compositions coming within the region X separated from the area A by the boundary indicated generally by line $a$, appear to be naturally substantially immune to food acids. This quality with these alloys is apparently due to the composition and exists irrespective of heat treatment, as, for example, in the fully annealed condition obtained by heating the material to or above its transformation point followed by a slow cooling over a period of hours. The relatively high-carbon-low-chromium alloys of compositions coming in the region Y, separated from the area A by the boundary indicated generally by line $b$, cannot be made immune to food acids by heat treatment, however high the temperature, so far as I am aware, and this appears to be due to presence of too high carbon, together with too low chromium.

With alloys of analysis falling in the area A and lying substantially adjacent to the line $a$, and extending to about the line $e$, which part of area A is indicated by the reference character B, the heat treatment to make moderately hard and to render substantially immune to food acids, such as vinegar, may consist merely in the ordinary hardening operation of raising to the temperature of the upper transformation point or slightly higher, and rapidly cooling, preferably by quenching in oil. The temperature where the upper transformation is encountered varies somewhat with the differing proportions of carbon and chromium, but at least for relatively thin articles, such as cutlery, with compositions within area B, so long as the quenching temperature is over the upper transformation point, (which can be readily obtained as by the use of an ordinary transformation meter) the material will be made moderately hard and also made substantially resistant to food acids by the heat treatment just described.

With compositions coming within the area C, forming the upper part of area A and extending from about the line $e$ to about the boundary line $b$, heat treatment by quenching from at or just above the upper transformation point, while it does produce moderate hardness, is not effective to impart substantial immunity to food acids, and I have discovered that such substantial immunity can be obtained by quenching from higher temperatures and, in addition, the material is also made decidedly harder by such treatment. For compositions falling at about the boundary line e of area C, it is sufficient in order to impart moderate hardness and also substantial immunity to food acids to quench from a temperature about 75-200° F. above the upper transformation point, as, for example, in the case of such alloys having an upper transformation point of about 1525° F., the material may be quenched from a temperature of about 1600-1700° F. For compositions within the area C, quenching temperatures for imparting a high degree of immunity to food acids and for securing a high degree of hardness are very substantially higher than the upper transformation point, and are progressively higher above the transformation point as line b is approached. With compositions coming in the neighborhood within area C and closely adjacent to line b, quenching temperatures of about 1900° F. and higher, up to about 2000° or 2100° F. give best results. From about 75° F. to about 575° F. above the upper transformation point is about the extreme range of the high temperature heat treatment of my invention. As already stated, compositions coming beyond the boundary line b in the region Y cannot be made immune to food acids by quenching from these or even higher temperatures.

While the highest quenching temperatures referred to are of greatest utility for imparting a high degree of immunity to food acids together with a high degree of hardness and stiffness only in that part of region C adjacent to boundary b, quenching from high temperatures greatly over the upper transformation point, such as a quenching temperature of 1900° F., may be resorted to with advantage for compositions throughout the entire area A, the material, and articles such as cutlery made from the material, being given a high degree of hardness and stiffness by such treatment, and having increased immunity to food acids imparted thereto. The quality of stiffness so obtained is of special importance for articles such as cutlery blades, in which it is desirable to produce a flexible blade which will not readily take a permanent set upon being bent.

The hardened alloy may be tempered or drawn, if desired, by reheating and cooling. (Tempering and drawing as used herein are equivalent words to mean one and the same thing.) Tempering or drawing is useful in the manufacture of cutlery and other hardened and tempered articles, and for material coming substantially close to line b the tempering or drawing heat should be kept fairly low, since if unduly high drawing temperatures are used, the imparted degree of immunity to action of food acids may be detracted from to a substantial extent. Drawing temperatures in the neighborhood of 500° F., give satisfactory results, but higher drawing temperatures may be used, and in general as the composition ranges from line b to line a, and especially in compositions of area B increased latitude in drawing temperatures to produce good spring temper can be allowed, particularly where the quenching temper is toward the high end of the quenching temperatures range above referred to.

The alloy should not be forged at temperatures under about 1600° F. to secure best results, and considerably higher forging temperatures may be used.

The present application is a continuation in part of my copending application Serial No. 533,325, filed Feb. 1, 1922, article hardened and made resistant to action of food acids by heat treatment and process of making same, and my application Serial No. 361,226, filed Feb. 25, 1920, process of heat treating alloy steel, abandoned in favor of my said application Serial No. 533,325.

The expression "containing percentages of carbon and chromium corresponding to the coordinates of any point within the herein identified area" as used in my claims refers to the drawing. For example, and without excluding other alloy percentages, an alloy having a carbon percentage of say .50 and a chromium percentage of say 11 corresponds to a point within area C; and an alloy having carbon percentage of say .80 and a chromium percentage of say 15 corresponds to a point within area B, and each of the foregoing to a point within area A.

I claim:

1. The process of imparting to alloys containing, upon analysis, percentages of chromium and carbon corresponding to the coordinates of any point within the herein identified area A and the principal part of the remainder iron, hardness and also a substantial immunity to food acids, which comprises heating same to a temperature about 75-575 degrees F. above their upper transformation point and rapidly cooling.

2. The process as in claim 1, the chromium and carbon percentages being in correspondence to the coordinates of any point within the herein identified area C.

3. The process of imparting to alloys containing, upon analysis, percentages of chromium and carbon corresponding to the coordinates of any point within the herein identified area A and the principal part of the remainder iron, hardness and also a substantial immunity to food acids, which comprises heating same to a temperature about 75–575 degrees F. above their upper transformation point and rapidly cooling, and tempering by reheating to approximately 500 degrees F. and cooling.

4. The process as in claim 3, the chromium and carbon percentages being in correspondence to the coordinates of any point within the herein identified area C.

5. The process of imparting to alloys containing, upon analysis, percentages of chromium and carbon corresponding to the coordinates of any point within the herein identified area A, a high degree of hardness and also a high degree of immunity to food acids, which comprises heating same to a temperature of about 200–575 degrees F. above the upper transformation point and rapidly cooling, and tempering by reheating and cooling.

6. The process as in claim 5, the chromium and carbon percentages being in correspondence to the coordinates of any point within the herein identified area C.

7. The process of imparting to alloys containing, upon analysis, percentages of chromium and carbon corresponding to the coordinates of any point within the herein identified area A, a high degree of hardness and also a high degree of immunity to food acids, which comprises heating same to a temperature of approximately 1700–1900 degrees F. and rapidly cooling, and tempering by reheating and cooling.

8. The process as in claim 7, the chromium and carbon percentages being in correspondence to the coordinates of any point within the herein identified area C.

In testimony whereof, I have signed my name hereto.

PERCY A. E. ARMSTRONG.